United States Patent [19]
Yokota

[11] Patent Number: 6,121,357
[45] Date of Patent: Sep. 19, 2000

[54] SOLID GOLF BALL

[75] Inventor: Masatoshi Yokota, Fukuchiyama, Japan

[73] Assignee: Sumitomo Rubber Industries, Ltd., Hyogo-ken, Japan

[21] Appl. No.: 09/080,299

[22] Filed: May 18, 1998

[30] Foreign Application Priority Data

May 16, 1997 [JP] Japan .................................. 9-126847

[51] Int. Cl.$^7$ .................................................. A63B 37/06
[52] U.S. Cl. ........................ 524/406; 524/432; 473/371; 473/372; 473/373
[58] Field of Search ................................ 473/371, 372, 473/373; 524/406, 432

[56] References Cited

U.S. PATENT DOCUMENTS

| | | |
|---|---|---|
| 5,730,664 | 3/1998 | Asakura . |
| 5,776,012 | 7/1998 | Moriyama . |
| 5,776,013 | 7/1998 | Yokota . |
| 5,800,287 | 9/1998 | Yokota . |
| 5,807,192 | 9/1998 | Yamagishi . |
| 5,879,244 | 3/1999 | Hwang . |

FOREIGN PATENT DOCUMENTS

| | | |
|---|---|---|
| 0648516A1 | 4/1995 | European Pat. Off. . |
| 0661084A2 | 7/1995 | European Pat. Off. . |
| 2182340 | 5/1987 | United Kingdom . |
| 2288603 | 10/1995 | United Kingdom . |
| 2298582 | 9/1996 | United Kingdom . |
| 2299517 | 10/1996 | United Kingdom . |
| 2299764 | 10/1996 | United Kingdom . |
| 2300124 | 10/1996 | United Kingdom . |

*Primary Examiner*—David J. Buttner
*Attorney, Agent, or Firm*—Birch, Stewart, Kolasch & Birch, LLP

[57] ABSTRACT

The present invention provides a solid golf ball having excellent shot feel at the time of hitting and excellent controllability at approach shot, while keeping the characteristics inherent to the solid golf ball, i.e. excellent flight performance. The present invention related to a solid golf ball comprising a core and a cover formed on the core, wherein the core is obtained by vulcanizing a rubber composition comprising a base rubber, a co-crosslinking agent, a vulcanization initiator and a filler, a calculated volume content of the co-crosslinking agent is 10.0 to 16.0% by volume, a total calculated volume content of the base rubber and the co-crosslinking agent is 96.2 to 98.0% by volume, based on the total rubber composition for the core, and the cover has a Shore D hardness of 50 to 67.

4 Claims, 1 Drawing Sheet

SOLID GOLF BALL

FIELD OF THE INVENTION

The present invention relates to a solid golf ball. More particularly, it relates to a solid golf ball having excellent shot feel at the time of hitting and excellent controllability at approach shot, while keeping the characteristics inherent to solid golf balls, i.e. excellent flight performance.

BACKGROUND OF THE INVENTION

Hitherto, there have been mainly produced two types of golf balls. The one is a solid golf ball, such as a two-piece golf ball or a three-piece golf ball, which is composed of a core formed from integrally molded rubber material and a thermoplastic resin cover (e.g. ionomer resin cover) formed on the core. The other is a thread wound golf ball which is composed of a solid or liquid center, a thread rubber wound layer formed on the center and a cover of ionomer resin or balata (transpolyisoprene) etc. having a thickness of 1 to 2 mm covering on the thread rubber wound layer. In the solid golf ball, a two-piece solid golf ball is composed of a core and a cover, and has been commercially available since 1982, because of easiness of production and the like. The two-piece solid golf ball has better durability and better flight performance because of larger initial velocity at the time of hitting and longer flight distance, when compared with the thread wound golf ball. Therefore, the two-piece solid golf ball is generally approved or employed by many golfers, mainly by the average golfer.

On the other hand, the two-piece solid golf ball exhibits much harder shot feel at the time of hitting than the thread wound golf ball. Therefore, the two-piece solid golf ball is not approved nor employed by some users such as elderly persons or women who are less athletic. In order to improve shot feel, it has been attempted to soften the core by reducing the hardness of the core. The method improves the shot feel, while sacrificing flight distance, because the rebound characteristics are degraded.

Recently, the two-piece solid golf ball has been approved and employed by professional golfers or top amateur golfers, because the two-piece solid golf ball has excellent flight performance and uniformity of quality between golf balls. The professional golfers or top amateur golfers require not only good shot feel but suitable controllability. The ionomer resin, which has been generally used for cover materials of two-piece solid golf balls, shows high rigidity and high hardness, in order to impart sufficient flight performance and durability to the golf ball, and thus deteriorating controllability.

In order to solve the above problem, it has been proposed that a golf ball has a cover formed from a resin having low rigidity and low hardness. However, the reduction of rigidity and hardness of the cover improves controllability, but degrades rebound characteristics of the cover, thus the resulting in a golf ball not having sufficient flight performance.

OBJECTS OF THE INVENTION

A main object of the present invention is to provide a solid golf ball having excellent shot feel and excellent controllability, while keeping the characteristics inherent to the solid golf ball, i.e. excellent flight performance.

According to the present invention, the object described above has been accomplished by adjusting the calculated volume content of the co-crosslinking agent and the total calculated volume content of the base rubber and the co-crosslinking agent to a specific range, and by employing a cover having a specific range of hardness.

SUMMARY OF THE INVENTION

Figure 1:
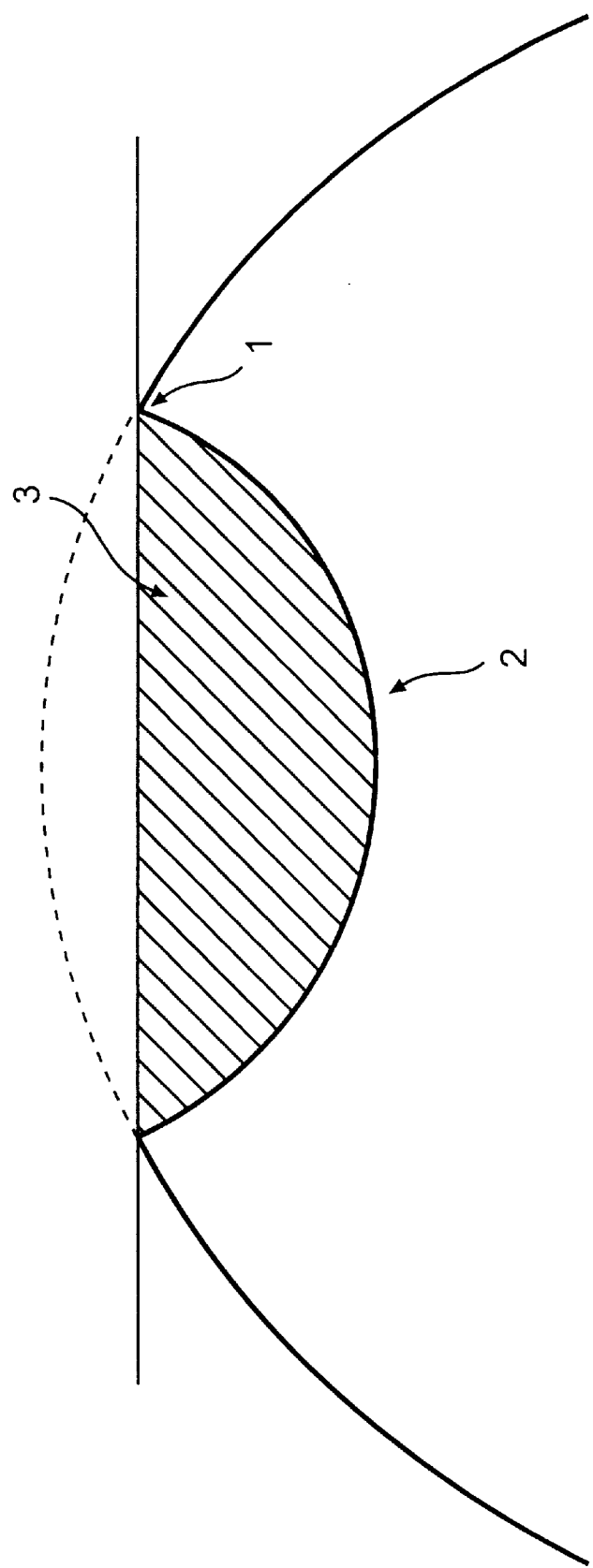
FIG. 1 is a schematic cross section of a dimple of the golf ball of the present invention.

The present invention provides a solid golf ball comprising a core and a cover formed on the core, wherein the core is obtained by vulcanizing a rubber composition comprising a base rubber, a co-crosslinking agent, a vulcanization initiator and a filler, a calculated volume content of the co-crosslinking agent is 10.0 to 16.0% by volume, a total calculated volume content of the base rubber and the co-crosslinking agent is 96.2 to 98.0% by volume, based on the total rubber composition for the core, and the cover has a Shore D hardness of 50 to 67.

DETAILED DESCRIPTION OF THE INVENTION

The solid golf ball of the present invention is composed of a core and a cover formed on the core. The core used for the solid golf ball of the present invention may be obtained by mixing a rubber composition using a mixer such as a mixing roll, and then vulcanizing or press-molding the rubber composition in a given mold into spherical form. The rubber composition comprises a base rubber, a co-crosslinking agent such as a metal salt of $\alpha,\beta$-unsaturated carboxylic acid, a vulcanization initiator such as an organic peroxide, a filler such as zinc oxide, an organic sulfide, optionally an antioxidant and the like. The vulcanization may be conducted, for example, by heating at 140 to 170° C. and 90 to 120 kgf/cm$^2$ for 10 to 40 minutes. The core may have single layer structure or multi-layer structure which has two or more layers.

The base rubber may be natural rubber and/or synthetic rubber which has been conventionally used for solid golf balls. Preferred is high cis-polybutadiene rubber containing a cis-1,4 bond of not less than 40%, preferably not less than 80%. The polybutadiene rubber may be mixed with natural rubber, polyisoprene rubber, styrene-butadiene rubber, ethylene-propylene-diene rubber (EPDM), and the like. The base rubber has a calculated volume content of 80 to 86% by volume, preferably 81 to 85% by volume, based on the total core volume. When the calculated volume content is smaller than 80%, an amount of rubber component is too small, and thus rebound characteristics of the core are degraded. On the other hand, when the calculated volume content is larger than 86%, an amount of co-crosslinking agent or vulcanization initiator is too small. Therefore, the core is too soft, and thus rebound characteristics of the core are degraded. The term "calculated volume content" as used herein refers to a content (volume content) of one component in a rubber composition, calculated from a volume value calculated by the following formula:

Calculated volume=$A/S$ wherein A is an amount of each component in the composition, and S is a specific gravity of that component in the composition.

The metal salt of $\alpha,\beta$-unsaturated carboxylic acid, which acts as a co-crosslinking agent, includes monovalent or divalent metal salts, such as zinc or magnesium salts of α,β-unsaturated carboxylic acids having 3 to 8 carbon atoms (e.g. acrylic acid, methacrylic acid, maleic acid, fumaric acid, etc.). Preferred co-crosslinking agent is zinc acrylate because it imparts high rebound characteristics to the resulting golf ball. An amount of the metal salt of the unsaturated carboxylic acid is a calculated volume content of 10.0 to 16.0% by volume, preferably 10.0 to 15.5% by volume, based on the total core volume. When the calculated volume content is larger than 16.0% by volume, the core is too hard, and thus shot feel is poor. On the other hand, the calculated volume content is smaller than 10.0%, the core is too soft, and thus rebound characteristics are degraded and shot feel is poor. In the present invention, it is required that the total calculated volume content of the base rubber and the co-crosslinking agent is adjusted to 96.2 to 98.0% by volume, based on the total core volume, by controlling the amount of the base rubber and the co-crosslinking agent. When the total calculated volume content of the base rubber and the co-crosslinking agent is smaller than 96.2% by volume, the amount of the crosslinked rubber forming component is small, and thus rebound characteristics are degraded. On the other hand, the total calculated volume content is larger than 98.0% by volume, the reaction of the base rubber with the co-crosslinking agent is insufficient because the amount of vulcanization initiator and vulcanizing aid is too small. Therefore, the core is too soft, and thus rebound characteristics are degraded.

The vulcanization initiator includes organic peroxide, such as dicumyl peroxide, 1,1-bis(t-butylperoxy)-3,3,5-trimethyl cyclohexane, 2,5-dimethyl-2,5-di(t-butylperoxy) hexane, t-butyl peroxide and the like. Preferred organic peroxide is dicumyl peroxide. An amount of the organic peroxide is from 0.3 to 5.0 parts by weight, preferably 0.5 to 3.0 parts by weight, based on 100 parts by weight of the base rubber. When the amount of the organic peroxide is smaller than 0.3 parts by weight, the core is too soft. Therefore, rebound characteristics are degraded to reduce flight distance. On the other hand, when the amount of the organic peroxide is larger than 5.0 parts by weight, the core is too hard, and thus shot feel is poor.

The filler can be one that has typically used for the core of golf balls, but zinc oxide, which also acts as a vulcanizing aid, is preferable. An amount of the filler is preferably from 2 to 15 parts by weight, based on 100 parts by weight of the base rubber. When the amount of the filler is smaller than 2 parts by weight, rebound characteristics are degraded. On the other hand, when the amount of the filler is larger than 15 parts by weight, a weight content of a rubber component in the core is too low. Therefore, rebound characteristics are degraded. In order to adjust a specific gravity of the core, inert fillers, such as barium sulfate, calcium carbonate, tungsten powder, tungsten carbide, lead, lead dioxide, nickel, copper and the like, and the mixture thereof may be also used as the filler. In the present invention, the filler preferably has high specific gravity. An amount of the filler is not limited and can vary depending on the size and specific gravity of the cover or core.

The rubber composition used for making the solid golf ball of the present invention may contain an organic sulfide compound, in addition to the above components. Examples of the organic sulfide compound include polysulfides having 2 to 4 sulfur atoms, such as diphenyl polysulfide, dibenzyl polysulfide, dibenzoyl polysulfide, dibenzothiazoyl polysulfide and the like, 4-methyl phenol sulfide, 4-ethyl phenol sulfide and the like. An amount of the organic sulfide compound is from 0.05 to 5.0 parts by weight, preferably from 0.1 to 3.0 parts by weight, based on 100 parts by weight of the base rubber. When the amount of the organic sulfide compound is smaller than 0.05 parts by weight, the solid golf ball does not sufficiently display the technical effects of the organic sulfide compound. On the other hand, when the amount of the organic sulfide compound is larger than 5.0 parts by weight, the technical effects do not continue to improve. By using the organic sulfide compound in the rubber composition for the core, the crosslinkage of the rubber by co-crosslinking agent shows high density, and thus rebound characteristics are improved.

The rubber composition for the core of the present invention can further contain other components which have been conventionally used for preparing the core of solid golf balls, such as antioxidant, peptizing agent and the like, in addition to the above components.

The rubber composition for the core of the present invention contains the inert filler, antioxidant and the like as described above, but they do not directly take part in the crosslinking of the rubber. They are used to adjust the specific gravity of the core or to inhibit of the oxidation. It is considered that the rebound of the core is obtained from the rebound of the rubber and depends on a volume of components used for forming the crosslinked rubber. Therefore, the rebound characteristics of the core can be improved by adjusting the total calculated volume content of the base rubber and the co-crosslinking agent as the components used for forming crosslinked rubber to 96.2 to 98.0% by volume, based on the total core volume, which is larger than that of the core conventionally used for golf balls.

The core used for the present invention preferably has a deformation amount of 2.6 to 4.3 mm, more preferably 2.8 to 4.2 mm, when applying from an initial load of 10 kg to a final load of 130 kg on the core. When the deformation amount is smaller than 2.6 mm, the core is too hard, and thus shot feel is poor. On the other hand, when the deformation amount is larger than 4.3 mm, the core is too soft, and thus rebound characteristics are degraded, and the shot feel of the resulting golf ball is poor, which is too heavy or light. The core has a diameter of 37.0 to 41.0 mm, preferably 37.5 to 40.0 mm. When the diameter of the core is smaller than 37.0 mm, rebound characteristics are degraded to reduce the flight distance of the resulting golf ball. On the other hand, when the diameter of the core is larger than 41.0 mm, a diameter of the resulting golf ball is too large. Therefore, air resistance when flying is large and reduces flight distance.

In the golf ball of present invention, a cover is covered on the core. The cover may also have single layer structure or multi-layer structure which has two or more layers. The cover may be formed from thermoplastic resins which has been conventionally used for forming the cover of solid golf balls, such as ionomer resin, polyester, nylon, a mixture thereof and the like. The ionomer resin may be a copolymer of α-olefin and α,β-unsaturated carboxylic acids having 3 to 8 carbon atoms, of which a portion of carboxylic acid groups is neutralized with metal ion. The α-olefin preferably includes ethylene and propylene. The α,β-unsaturated carboxylic acids preferably includes acrylic acid, methacrylic acid and the like. The metal ion which neutralizes a portion of carboxylic acid groups of the copolymer includes alkali metal ion, such as sodium ion, potassium ion, lithium ion and the like; divalent metal ion, such as zinc ion, calcium ion, magnesium ion, and the like; trivalent metal ion, such as aluminum ion, and the like; and the mixture thereof. Preferred are sodium ion, zinc ion, lithium ion and the like, in view of rebound characteristics, durability and the like. The ionomer resin is not limited, but examples thereof are shown by a trade name thereof. Examples of the ionomer resin, which is commercially available from Du Pont Co., include Surlyn AD8541, Surlyn AD8542, and the like. Examples of the ionomer resin, which is commercially available from Mitsui Du Pont Polychemical Co., include Hi-milan 1555, Hi-milan 1557, Hi-milan 1605, Hi-milan 1652, Hi-milan 1705, Hi-milan 1706, Hi-milan 1707, Hi-milan 1855, Hi-milan 1856, Hi-milan AD8265, and the like. Examples of the ionomer resin, which is commercially available from Exxon Chemical Co., include Iotec 7010, Iotec 8000, and the like. These ionomer resins may be used alone or in combination.

The cover used in the present invention may optionally contain fillers (such as barium sulfate, etc.), pigments (such as titanium dioxide, etc.), and the other additives such as a dispersant, an antioxidant, a UV absorber, a photostabilizer and a fluorescent agent or a fluorescent brightener, etc., in addition to the resin component, as long as the addition of the additives does not deteriorate the desired performance of the golf ball cover, but an amount of the pigment is preferably from 0.1 to 5.0 parts by weight, based on 100 parts by weight of the cover resin.

A method of covering the core with the cover layer is not specifically limited, but may be a conventional method. For example, there can be used a method comprising molding the cover composition into a semi-spherical half-shell, covering a core with two of the half-shells, followed by pressure molding at 130 to 170° C. for 1 to 15 minutes, or a method comprising injection molding the cover composition directly on the core to cover it.

It is required that the cover used in the present invention has a Shore D hardness of 50 to 67, preferably 55 to 65. When the Shore D hardness is smaller than 50, the cover is too soft. Therefore, rebound characteristics are degraded and reduce flight distance. On the other hand, when the Shore D hardness is larger than 67, the cover is too hard, and thus the controllability and shot feel of the resulting golf ball are degraded.

It may be required that the cover used in the present invention has a thickness of 1.2 to 2.4 mm, preferably 1.3 to 2.3 mm. When the thickness is smaller than 1.2 mm, the resulting golf ball is too soft, and thus rebound characteristics are degraded. On the other hand, when the thickness is larger than 2.4 mm, the resulting golf ball is too hard, and thus the controllability and shot feel are degraded.

When molding the cover, dimples may be optionally formed on the surface of the golf ball. The total volume of the dimples formed is preferably 270 to 340 mm³. When the total volume is smaller than 270 mm³, the depth of the dimple is too small. Therefore, the resulting golf ball creates blown-up trajectory to reduce flight distance. On the other hand, the total volume is larger than 340 mm³, the depth of the dimple is too large. Therefore, the resulting golf ball creates low angle trajectory to reduce flight distance. Furthermore, paint finishing or stamping may be optionally conducted after molding the cover for serving commercial sell.

The golf ball as described above preferably has a deformation amount of 2.3 to 3.9 mm, more preferably 2.5 to 3.6 mm, when applying from an initial load of 10 kg to a final load of 130 kg on the golf ball. When the deformation amount is smaller than 2.3 mm, the golf ball is too hard, and thus shot feel is poor. On the other hand, the deformation amount is larger than 3.9 mm, the golf ball is too soft. Therefore, rebound characteristics are degraded and reduce flight distance, and shot feel is heavy and poor.

EXAMPLES

The following Examples and Comparative Examples further illustrate the present invention in detail but are not to be construed to limit the scope of the present invention thereto.

Production of cores

The core rubber compositions having formulations shown in Table 1 were mixed and then vulcanized or press-molded in a mold to obtain spherical cores having a diameter of 39.0 mm. The vulcanization is conducted at 140° C. for 25 minutes and then at 165° C. for 8 minutes. Deformation amount when applying from an initial load of 10 kg to a final load of 130 kg on the core and rebound characteristics of the resulting cores were measured. The results are shown in FIG. 1.

TABLE 1

| Core composition | I | II | III | IV | V | VI | VII |
|---|---|---|---|---|---|---|---|
| Base rubber*1 | 100 | 100 | 100 | 100 | 100 | 100 | 100 |
| Co-crosslinking agent*2 | 24 | 28 | 32 | 20 | 36 | 28 | 32 |
| Zinc oxide | 5 | 5 | 5 | 5 | 5 | 18.9 | 20.0 |
| Dicumyl peroxide | 2.0 | 2.0 | 2.0 | 2.0 | 2.0 | 1.2 | 1.2 |
| Tungsten | 13.1 | 11.8 | 10.6 | 14.2 | 9.4 | — | — |
| Antioxidant*3 | 0.5 | 0.5 | 0.5 | 0.5 | 0.5 | 0.5 | 0.5 |
| Diphenyl disulfide | 0.5 | 0.5 | 0.5 | 0.5 | 0.5 | — | — |
| Calculated volume content (% by volume) | | | | | | | |
| Co-crosslinking agent (a) | 11.7 | 13.4 | 15.0 | 9.9 | 16.6 | 13.3 | 14.9 |
| Base rubber (b) | 84.7 | 83.1 | 81.6 | 86.3 | 80.1 | 82.4 | 81.0 |
| (a) + (b) | 96.4 | 96.5 | 96.6 | 96.2 | 96.7 | 95.7 | 95.9 |
| Deformation amount (mm) | 4.0 | 3.5 | 3.0 | 4.5 | 2.5 | 3.5 | 3.0 |
| Coefficient of restitution | 100 | 103 | 105 | 96 | 107 | 95 | 98 |

*1Polybutadiene (trade name "BR-18") from JSR Co., Ltd.
*2Zinc acrylate
*3Antioxidant (trade name "Yoshinox 425") from Yoshitomi Pharmaceutical Inds., Ltd.

Examples 1 to 7 and Comparative Examples 1 to 6

A cover layer was formed by directly injection molding the cover composition having formulations shown in Table 2 on the resulting core. Then, a paint was applied on the surface to produce a two-piece golf ball having a diameter of 42.7 mm and a weight of 45.4 g. Deformation amount, total dimple volume, coefficient of restitution, flight distance, controllability and shot feel of the resulting golf balls were determined and evaluated. The results are shown in Table 3 and 4. The test methods are as follows.

TABLE 2

| Cover composition | A | B | C | D |
|---|---|---|---|---|
| Hi-milan 1605*4 | — | — | 5 | 50 |
| Hi-milan 1706*5 | — | — | — | 50 |
| Hi-milan 1555*6 | — | 10 | 10 | — |
| Hi-milan 1855*7 | — | 45 | 85 | — |
| Hi-milan 1856*8 | — | 45 | — | — |
| Hi-milan AD8265*9 | 100 | — | — | — |
| Titanium dioxide | 2 | 2 | 2 | 2 |
| Barium sulfate | 2 | 2 | 2 | 2 |
| Shore D hardness | 47 | 57 | 62 | 70 |

*4Hi-milan 1605 (trade name), ethylene-methacrylic acid copolymer ionomer resin obtained by neutralizing with sodium ion, manufactured by Mitsui Du Pont Polychemical Co., Ltd., Shore D hardness = 62
*5Hi-milan 1605 (trade name), ethylene-methacrylic acid copolymer ionomer resin obtained by neutralizing with zinc ion, manufactured by Mitsui Du Pont Polychemical Co., Ltd., Shore D hardness = 61

TABLE 2-continued

| Cover composition | A | B | C | D |
| --- | --- | --- | --- | --- |

*[6]Hi-milan 1555 (trade name), ethylene-methacrylic acid copolymer ionomer resin obtained by neutralizing with sodium ion, manufactured by Mitsui Du Pont Polychemical Co., Ltd., Shore D hardness = 62
*[7]Hi-milan 1855 (trade name), ethylene-butyl acrylate-methacrylic acid terpolymer ionomer resin obtained by neutralizing with zinc ion, manufactured by Mitsui Du Pont Polychemical Co., Ltd., Shore D hardness = 56
*[8]Hi-milan 1856 (trade name), ethylene-butyl acrylate-methacrylic acid terpolymer ionomer resin obtained by neutralizing with sodium ion, manufactured by Mitsui Du Pont Polychemical Co., Ltd., Shore D hardness = 58
*[9]Hi-milan AD8265 (trade name), ethylene-butyl acrylate-methacrylic acid terpolymer ionomer resin obtained by neutralizing with sodium ion, manufactured by Mitsui Du Pont Polychemical Co., Ltd., Shore D hardness = 47

Test method (1) Deformation amount

The deformation amount of core or golf ball was determined by measuring a deformation amount when applying from an initial load of 10 kg to a final load of 130 kg on the core or golf ball.

(2) Coefficient of restitution of core

A cylinder having a weight of 198.4 g was struck at a speed of 45 cm/sec against a core, and the velocities of the core and the cylinder before and after the strike were measured. The coefficient of restitution of the core was calculated from the velocity and the weight of both the cylinder and the core, and was indicated by index when the value of Core I was 100.

(3) Total dimple volume

Total dimple volume was determined by measuring the total of dimple volume 3 shown in FIG. 1, which is defined by the plane contacted with dimple edge 1. In FIG. 1, 2 is dimple.

(4) Coefficient of restitution of golf ball

A cylinder having a weight of 198.4 g was struck at a speed of 45 cm/sec against a golf ball, and the velocities of the golf ball and the cylinder before and after the strike were measured. The coefficient of restitution of the golf ball was calculated from the velocity and the weight of both the cylinder and the golf ball, and was indicated by index when the value of Example 1 was 100.

(5) Flight distance

After a No. 1 wood club (a driver) was mounted to a swing robot manufactured by True Temper Co. and a golf ball was hit at a head speed of 45 m/second, a flight distance (carry) to the first dropping point of the hit golf ball was measured.

(6) Controllability at approach shot

The controllability at approach shot of the resulting golf ball was evaluated by 10 professional golfers according to practical hitting test by a driver and a pitching wedge. The evaluation criteria are as follows.

Evaluation criteria

○: Not less than 8 out of 10 golfers felt that the golf ball was easily controlled.
Δ: About 4 to 7 out of 10 golfers felt that the golf ball was easily controlled.
×: Not more than 3 out of 10 golfers felt that the golf ball was easily controlled.

(7) Shot feel

The shot feel of the resulting golf ball was evaluated by 10 professional golfers according to practical hitting test by a driver. The evaluation criteria are as follows.

Evaluation criteria

○: Not less than 8 out of 10 golfers felt that the golf ball had good shot feel.
Δ: About 4 to 7 out of 10 golfers felt that the golf ball had good shot feel.
×: Not more than 3 out of 10 golfers felt that the golf ball had good shot feel.

Deformation amount, total dimple volume, coefficient of restitution of golf ball, controllability at approach shot and shot feel of the golf balls of Example 1 to 7 were shown in Table 3, and those of Comparative Example 1 to 6 were shown in Table 4.

TABLE 3

| Example No. | 1 | 2 | 3 | 4 | 5 | 6 | 7 |
| --- | --- | --- | --- | --- | --- | --- | --- |
| Core composition | I | II | II | III | III | III | III |
| Cover composition | C | B | C | B | C | C | C |
| Deformation amount (mm) | 3.4 | 3.1 | 3.0 | 2.7 | 2.6 | 2.6 | 2.6 |
| Total dimple volume (mm³) | 300 | 300 | 300 | 300 | 280 | 300 | 320 |
| Coefficient of restitution | 100 | 102 | 103 | 104 | 106 | 106 | 106 |
| Flight distance (yard) | 241 | 243 | 244 | 244 | 245 | 246 | 245 |
| Controllability | | | | | | | |
| Driver | ○ | ○ | ○ | ○ | ○ | ○ | ○ |
| Pitching wedge | ○ | ○ | ○ | ○ | ○ | ○ | ○ |
| Shot feel | ○ | ○ | ○ | ○ | ○ | ○ | ○ |

TABLE 4

| Comparative Example No. | 1 | 2 | 3 | 4 | 5 | 6 |
| --- | --- | --- | --- | --- | --- | --- |
| Core composition | IV | V | VI | VII | III | III |
| Cover composition | C | C | C | C | A | D |
| Deformation amount (mm) | 4.0 | 2.2 | 3.0 | 2.7 | 3.2 | 2.9 |
| Total dimple volume (mm³) | 300 | 300 | 300 | 300 | 300 | 300 |
| Coefficient of restitution | 95 | 108 | 94 | 97 | 92 | 111 |
| Flight distance (yard) | 235 | 244 | 238 | 239 | 235 | 248 |
| Controllability | | | | | | |
| Driver | × | × | Δ | Δ | × | × |
| Pitching wedge | ○ | × | ○ | ○ | ○ | × |
| Shot feel | × | × | Δ | Δ | × | × |

As is apparent from the comparison of the physical properties of the golf balls of Examples 1 to 7 shown in Table 3 with those of the golf balls of Comparative Examples 1 to 6 shown in Table 4, the golf balls of the present invention (Examples 1 to 7) have longer flight distance, better controllability and better shot feel than the golf balls of Comparative Examples 1 to 6. In the golf balls of the present invention (Examples 1 to 7), a calculated volume content of a co-crosslinking agent is 10.0 to 16.0% by volume, a total calculated volume content of a base rubber and a co-crosslinking agent is 96.2 to 98.0% by volume, based on a total core volume, and a cover has a Shore D hardness of 50 to 67. In the golf balls of Comparative Examples 1 to 6, the calculated volume content of the co-crosslinking agent, the total calculated volume content of the base rubber and the co-crosslinking agent, or Shore D hardness of the cover is out of the above specific range. In the golf ball of Comparative Example 1 having lower calculated volume content of the co-crosslinking agent than the golf balls of Examples, the core is too soft, and thus flight distance is short and controllability when hit by a driver and shot feel are degraded. In the golf ball of Comparative Example 2 having higher calculated volume content of the co-crosslinking agent than the golf balls of Examples, the core is too hard, and thus controllability and shot feel are degraded. In the golf balls of Comparative Examples 3 and 4 having lower total calculated volume content of the base rubber and the co-crosslinking agent than the golf balls of Examples, coefficient of restitution is small, and thus flight distance is short. In the golf ball of Comparative Example 5 having lower cover hardness than the golf balls of Examples, coefficient of restitution is small and the resulting golf ball creates blow-up trajectory, and thus flight distance is small and shot feel is poor. In the golf ball of Comparative Example 6 having higher cover hardness than the golf balls of Examples, controllability and shot feel are poor.

What is claimed is:

1. A two-piece solid golf ball comprising a core and a cover formed on the core, wherein the core is obtained by vulcanizing a rubber composition comprising a base rubber, a co-crosslinking agent, a vulcanization initiator and a filler, a calculated volume content of the co-crosslinking agent is 10.0 to 16.0% by volume, a total calculated volume content of the base rubber and the co-crosslinking agent is 96.2 to 98.0% by volume, based on the total rubber composition for the core, and the cover has a Shore D hardness of 50 to 67;

wherein the rubber composition further comprises an organic sulfide compound.

2. The two piece solid golf ball according to claim 1, wherein the core has a diameter of 37.5 to 41.0 mm.

3. The two piece solid golf ball according to claim 1, wherein the core has a deformation amount of 2.6 to 4.3 mm, when applying from an initial load of 10 kg to a final load of 130 kg on the core.

4. The two piece solid golf ball according to claim 1, wherein the core has a diameter of 37.0 to 41.0 mm and the cover has a thickness of 1.2 to 2.4 mm.

* * * * *